Dec. 22, 1931. L. COSTANIEVICH 1,837,896
METHOD OF PROMOTING PROPELLER EFFICIENCY AND MEANS THEREOF
Filed Jan. 5, 1929   5 Sheets-Sheet 1

Inventor:
Leone Costanievich

Inventor:
Leone Costanievich

Dec. 22, 1931.   L. COSTANIEVICH   1,837,896
METHOD OF PROMOTING PROPELLER EFFICIENCY AND MEANS THEREOF
Filed Jan. 5, 1929   5 Sheets-Sheet 4
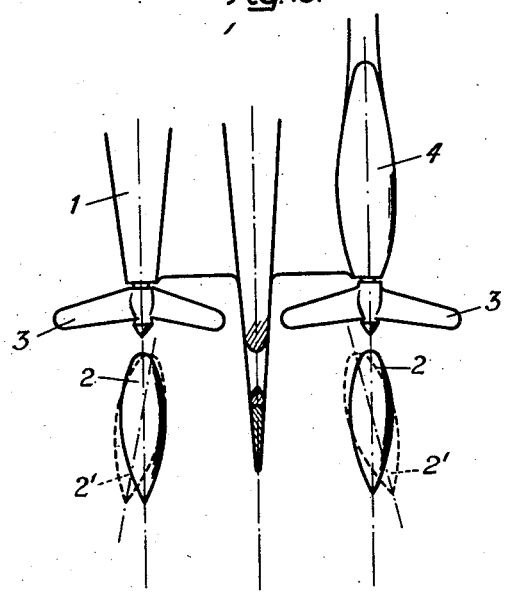
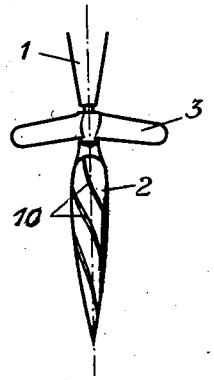

Dec. 22, 1931.  L. COSTANIEVICH  1,837,896
METHOD OF PROMOTING PROPELLER EFFICIENCY AND MEANS THEREOF
Filed Jan. 5, 1929  5 Sheets-Sheet 5
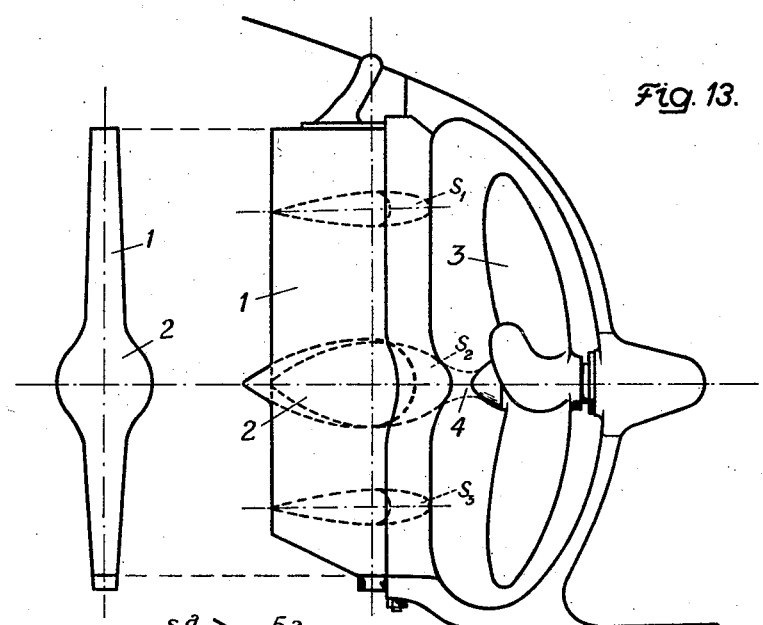
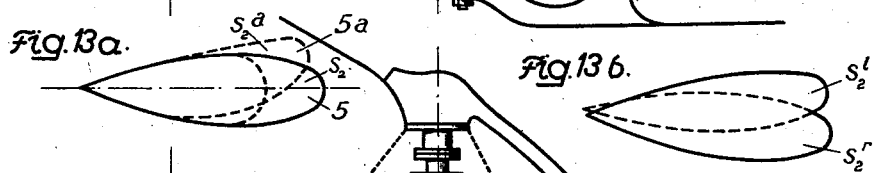
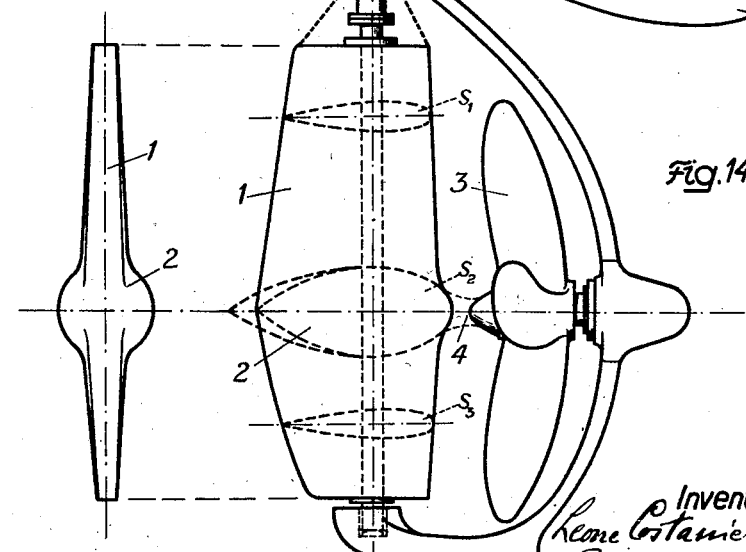

Patented Dec. 22, 1931

1,837,896

UNITED STATES PATENT OFFICE

LEONE COSTANIEVICH, OF TRIESTE, ITALY

METHOD OF PROMOTING PROPELLER EFFICIENCY AND MEANS THEREOF

Application filed January 5, 1929, Serial No. 330,677, and in Germany August 2, 1928.

My invention has for its object to provide means for improving or increasing in propeller-driven vessels, or other propeller-operated apparatus, the propeller efficiency, irrespective of the medium in which the propeller works.

As is well known, there are created by the revolving propeller aft of the same eddies, which have a retarding effect. These eddies are due to hollow spaces in the medium in which the propeller works, and I have discovered that if the cavitation region formed by these hollow spaces is filled up, the formation of the retarding eddies is entirely prevented, with the result of a greatly increased propeller efficiency.

To this end, I provide aft of the propeller, suitably spaced therefrom, a solidly streamlined, substantially pear-shaped member, which in filling up the said cavitation region thereby increases the density of the surrounding medium and thus greatly improves or increases the propelling effect of the propeller.

The said pear-shaped member can either be separately supported in its position aft of the propeller, or it can also be attached to the boss of the propeller, being suitably spaced from the latter. There are, of course, many ways in which to carry out the invention, and I have shown various embodiments thereof, by way of illustration, on the annexed drawings, on which Fig. 1 shows an embodiment of one form of the present invention in which the efficiency promoting members are of a rounded shape and which also shows diagrammatically the manner of their application in the case of a twin screw vessel.

Fig. 10 shows a special disposition of the efficiency promoting member behind the screw.

Fig. 11 shows a particular embodiment of the propulsion increasing member.

Fig. 12 shows an example of how the upper surface of the member may be formed.

Figs. 13, 13a, 13b and 14 show the propulsion increasing member connected to various forms of stream line rudders.

Figure 1:
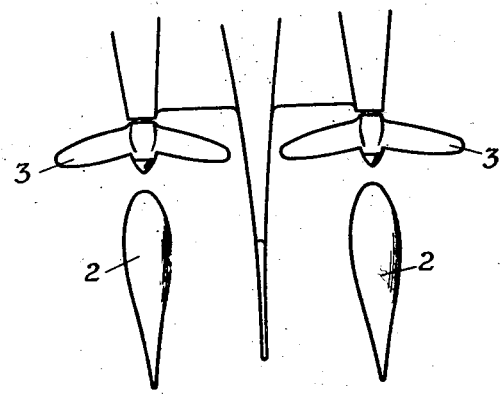

As will be seen from the drawings, the propulsion increasing member 2 has a substantially pear-shaped or fish-shaped form although, as is also shown in the drawings, it is by no means restricted thereto. However, it is essential that the member be given such a shape that it will fill up the space of lower density in the driving medium behind the propeller thereby increasing the propulsive effect by reducing or preventing cavitation effects.

Figure 2:
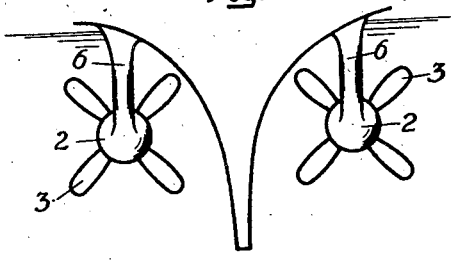
Fig. 2 is a rear view of Fig. 1.

As will be seen from Figs. 1 and 2, in which two propulsion increasing members are shown indicated at 2, they can be held in position behind their respective screws 3 by means of arms attached to the side of the ship.

Figure 3:
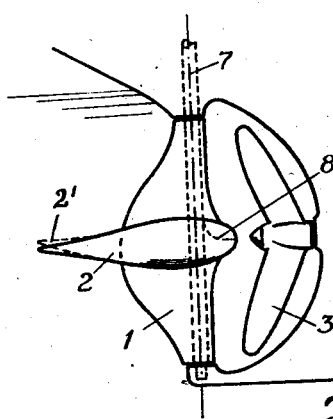
Fig. 3 is a side view of a propulsion increasing member superimposed upon or incorporated in a rudder.

In Fig. 3, the member 2 is shown attached to a rudder surface 1. 7 is the rudder post. The dotted line 8 shows where water is fed to the apex of the propulsion increasing member and whence it streams out against the screw. The water thus fed may be of any desired quantity per unit of time and serves the purpose of increasing the propulsive effect. Consequently it will also suffice if merely an inlet for water be provided, because a similar effect is produced as is produced by the member 2. The water can be brought from behind against the screw in any desired way.

The dotted line 2' in Fig. 3 shows a modified shape of the member which may be adopted.

Figure 4:
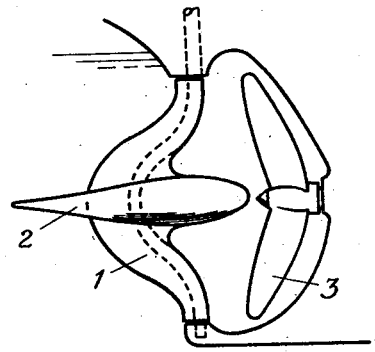
Fig. 4 shows another embodiment of a combined rudder and body.

Fig. 4 shows a somewhat different embodiment which will be readily understood with the aid of the corresponding reference numbers.

Figure 5:
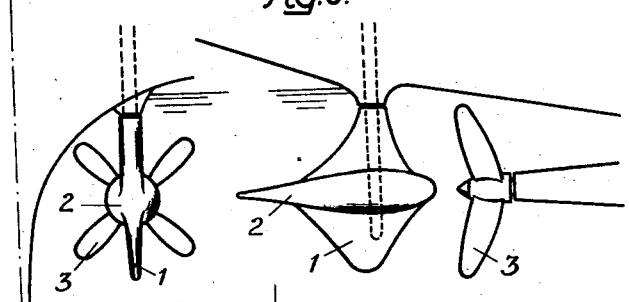
Fig. 5 is a side view and rear view of a further modification, namely, of a freely suspended balance rudder.

In Fig. 5, the pear-shaped or fish-shaped member 2 together with the steering surface 1 is arranged in combination as a freely suspended balance rudder.

Figure 6:
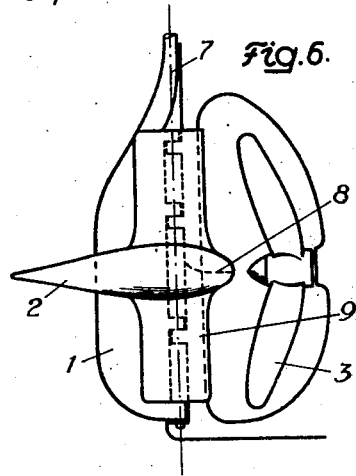
Fig. 6 illustrates a method of attaching the propulsion increasing member to an existing rudder.

Fig. 6 shows a method of attaching the member 2 to a rudder already in use. 3 is the screw, 2 the propulsion increasing member, 1 the normal rudder, 8 the supply of fluid (where such is used), 9 a cover for the rudder post so as to avoid as far as possible any eddies being set up in the water led to the pear-shaped member.

Figure 7:
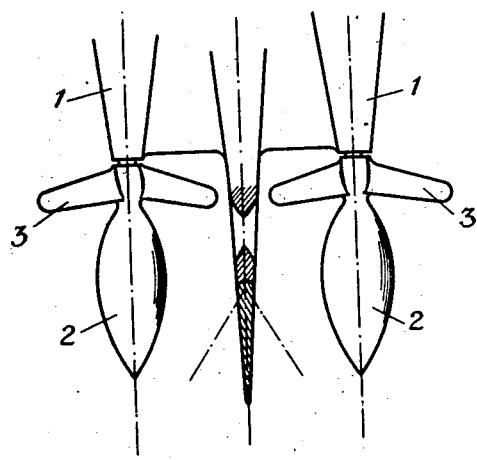
Figs. 7, 8 and 9 illustrate a method of attaching the propulsion increasing member directly to the screw.
Figure 8:
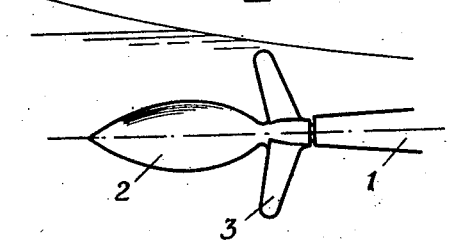
Figure 9:
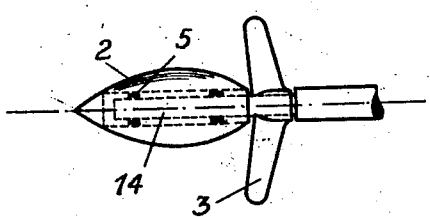

In Figs. 7 to 9, the member 2 is connected directly to the screw 3; this connection is shown in Figs. 7 and 8 as being rigid and positive, so that the member 2 participates in the revolution of the screw 3. The member 2, however, can also be connected to the screw 3 or to its shaft or boss in such a way that it is freely rotatable on one of these parts and is not compelled to participate in the revolution of the propeller shaft. This is shown in Fig. 9. The propeller shaft is fitted with an extension 4 on which the member 2 is by means of suitable bearing points arranged to be freely rotatable.

With reference to Fig. 10, the effect of member 2 is enhanced by connecting up over the shaft lining 1 and in front of the propeller 3 a longitudinally extended pear-shaped member 4 in order to improve the supply of the water suctioned by the screw. The member 4 may be of any desired shape, not only with regard to its cross section but also with regard to its upper surface. More particularly, this member may be used by itself alone and, where possible, may also be arranged directly on the propeller shaft or directly connected to the screw.

In this case, as well as in the other forms of carrying out the present invention the propulsion and steering member, according to the direction of rotation of the screw and more particularly its foremost end, can be distorted either towards the left or towards the right of the straight prolongation of the propeller shaft (2').

In Fig. 11, the propulsion and steering member 2 is given the cross section of the most favourable bearing surface and its rear end can be turned towards the left or towards the right according to the direction of rotation of the screw.

It may be pointed out here that the cross section of the propeller related member can in every instance be of any desired shape, that is to say, it need not necessarily be round. On the contrary it may be oval in shape, triangular or quadrilateral, or it may be given the shape of a polygon or any other desired shape. The cross section can, irrespective of its form, not only be distorted in the longitudinal direction of the member, but the cross section of the upper portion of the member can be transposed as against the lower portion or vice versa.

In Fig. 12, the propulsion or steering member 2 is fitted with a spiral guide groove 10, or with a guide strip, the spirals being arranged in the same direction or in a direction contrary to the direction of rotation of the screw. Guide surfaces of merely screw shape may be employed.

With reference to Fig. 13, 1 is a stream line rudder, 2 the very distinctly pear-shaped protuberance on the rudder, and 3 is the screw. On the left hand side of the main figure is a view of the rudder with the member 2 looked at from the front. The sections $s_1$ and $s_3$ in Fig. 13 show the cross sections of, for example, the standard Oertz rudder, whilst $s_2$ is a section through the built-in propulsion and steering member. In this case the propulsion increasing and steering member is arranged on the prolongation of the propeller shaft and fixed to the rudder itself.

4 indicates the possibility of a rigid or loose connection, for example by means of a branch connection, between the boss of the propeller and the propulsion increasing member.

In Fig. 13a, the shape of the member is such that its head can be bent laterally from 5 to 5a, 5a being bent towards the left or towards the right according to the direction of rotation of the screw and as seen from above.

In Fig. 13b, the upper half of the pear shaped protuberance is formed for example like $s_2l$, the lower half like $s_2r$, and in such a way that both halves are transposed as against each other and distorted.

Fig. 14 shows a possible form of application of the propulsion increasing and steering member in connection with a stream line balance rudder of modern construction. The reference numbers are the same as in Fig. 13.

When the propulsion increasing body is connected to rudders of any kind, it is of course possible and it will likewise be found suitable, to arrange the propulsion increasing body in such a way that its foremost end lies in the conceived axis of rotation of the rudder. In this case, the forward edge of the rudder lies in this axial direction.

There may be cases in which it will be advantageous to associate the propulsion increasing member with a counter-rudder, counter-propeller or other so-called diminishing device, and the present invention is to be regarded as including such arrangements.

With regard to the make of the propulsion increasing member, this can be of any material suitable for the purpose in view, and can be solid or, what will be found particularly suitable, hollow. In the latter form, when applied to steamers, it will produce a lift which considerably reduces the weight of the rudder. The result is that thrust-bearing friction is diminished and that less power is required for working the rudder, apart altogether from the fact that the whole surface of the rudder can be of smaller proportions.

I claim:

1. In combination, a propeller, and means disposed aft of the propeller to substantially fill the normal medial cavitation region formed by the propeller when the same is in operation, said means comprising a substantially pear-shaped body having a substantially spherically-shaped forward end spaced rearwardly from the propeller, said body being of stream line shape and increasing in diameter from its forward end rearwardly to a substantially medial point and from such substantially medial point tapering rearwardly to its rear end, said body being of a size and shape corresponding substantially to the size and shape of said cavitation region.

2. The combination as set forth in claim 1 in which said substantially pear-shaped body is mounted with its longitudinal axis at an angle to the axis of rotation of the propeller to compensate for deflection of the axis of the cavitation region from the axis of the propeller depending upon the direction of rotation of the propeller.

3. The combination as set forth in claim 1 in which the after end of the substantially pear-shaped body is deflected upwardly to compensate for upward deflection of the cavitation region due to the pressure and density of the medium in which the propeller operates being normally less above than below the propeller.

4. The combination as set forth in claim 1 in which said substantially pear-shaped body is longitudinally bowed or curved to conform to the normal longitudinal bow or curvature of the cavitation region.

In testimony whereof I have affixed my signature.

ING. LEONE COSTANIEVICH.